(12) United States Patent
Wang et al.

(10) Patent No.: US 10,792,616 B2
(45) Date of Patent: Oct. 6, 2020

(54) ION EXCHANGED SYNTHETIC PHYLLOSILICATE AS SCR CATALYST

(71) Applicant: BASF Corporation, Florham Park, NJ (US)

(72) Inventors: Xiaoming Wang, Springfield, NJ (US); Xiaofan Yang, Highland Park, NJ (US); Meaghan C. McGuire, Nanuet, NY (US); Geoffrey M. Johnson, Wappingers Falls, NY (US); John K. Hochmuth, Raritan, NJ (US)

(73) Assignee: BASF Corporation, Florham Park, NJ (US)

( * ) Notice: Subject to any disclaimer, the term of this patent is extended or adjusted under 35 U.S.C. 154(b) by 43 days.

(21) Appl. No.: 15/752,112

(22) PCT Filed: Aug. 12, 2016

(86) PCT No.: PCT/US2016/046745
§ 371 (c)(1),
(2) Date: Feb. 12, 2018

(87) PCT Pub. No.: WO2017/030947
PCT Pub. Date: Feb. 23, 2017

(65) Prior Publication Data
US 2018/0236402 A1 Aug. 23, 2018

Related U.S. Application Data

(60) Provisional application No. 62/205,557, filed on Aug. 14, 2015.

(51) Int. Cl.
*B01D 53/94* (2006.01)
*B01J 29/04* (2006.01)
(Continued)

(52) U.S. Cl.
CPC ..... *B01D 53/9418* (2013.01); *B01D 53/9436* (2013.01); *B01J 29/049* (2013.01);
(Continued)

(58) Field of Classification Search
CPC ... F01N 3/2066; B01J 29/049; B01J 35/0006; B01J 37/0215; B01J 37/0244;
(Continued)

(56) References Cited

U.S. PATENT DOCUMENTS 4,661,464 A * 4/1987 Atkins ............... B01J 20/12
423/118.1
5,415,850 A 5/1995 Yang et al.
(Continued)

FOREIGN PATENT DOCUMENTS

EP 0 976 449 A1 2/2000

OTHER PUBLICATIONS

Yang, R.T., et al., "Pillared Clays as Superior Catalysts for Selective Catalytic Reduction of NO with NH3," *Industrial Engineering Chemistry Research*, 1992, vol. 31 (6), pp. 1440-1445.
(Continued)

*Primary Examiner* — Audrey K Bradley
(74) *Attorney, Agent, or Firm* — Womble Bond Dickinson (US) LLP

(57) ABSTRACT

The present disclosure is directed to SCR catalysts, methods for their manufacture, and methods of treating emissions in an exhaust stream with them. The SCR catalysts are produced from pillaring and ion exchanging synthetic phyllosilicates, particularly hydrothermally synthesized phyllosilicates.

8 Claims, 3 Drawing Sheets

(51) Int. Cl.
*B01J 37/02* (2006.01)
*B01J 35/00* (2006.01)
*F01N 3/20* (2006.01)

(52) U.S. Cl.
CPC ....... *B01J 35/0006* (2013.01); *B01J 37/0215* (2013.01); *B01J 37/0244* (2013.01); *F01N 3/2066* (2013.01); *B01D 2255/104* (2013.01); *B01D 2255/2063* (2013.01); *B01D 2255/2065* (2013.01); *B01D 2255/2073* (2013.01); *B01D 2255/20707* (2013.01); *B01D 2255/20715* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/30* (2013.01); *B01D 2255/50* (2013.01); *B01D 2255/9032* (2013.01); *B01D 2255/9202* (2013.01); *B01D 2255/9205* (2013.01); *B01D 2255/9207* (2013.01); *B01J 2229/186* (2013.01); *Y02A 50/2325* (2018.01)

(58) Field of Classification Search
CPC ........... B01J 2229/186; Y02A 50/2325; B01D 53/9418; B01D 53/9436; B01D 2255/104; B01D 2255/2063; B01D 2255/2065; B01D 2255/20707; B01D 2255/20715; B01D 2255/20723; B01D 2255/2073; B01D 2255/20738; B01D 2255/20746; B01D 2255/20753; B01D 2255/20761; B01D 2255/30; B01D 2255/50; B01D 2255/9032; B01D 2255/9202; B01D 2255/9205; B01D 2255/9207
See application file for complete search history.

(56) References Cited

U.S. PATENT DOCUMENTS

| | | |
|---|---|---|
| 7,601,662 B2 | 10/2009 | Bull et al. |
| 8,293,182 B2 | 10/2012 | Boorse et al. |
| 2007/0081934 A1 | 4/2007 | Hubig et al. |
| 2008/0292519 A1 | 11/2008 | Caudle et al. |
| 2010/0111796 A1 | 5/2010 | Caudle et al. |
| 2014/0170032 A1 | 6/2014 | Yang et al. |
| 2014/0255328 A1 | 9/2014 | McGuire et al. |
| 2015/0037233 A1 | 2/2015 | Fedeyko et al. |
| 2016/0367941 A1* | 12/2016 | Gilbert .............. B01D 53/9468 |

OTHER PUBLICATIONS

Dorado et al. "Cooper ion-exchanged and impregnated Fepillared clays", Applied Catalysis A: Gen. Elsevier, Amsterdam, NL, vol. 305, No. 2, May 24, 2006, pp. 189-196, XP005413985.

Dorado F. et al. "Preparation of Cu-ion-exchanged Fe-PILCs for the SCR of NO by Propene", Applied Catalysis B: Environmental, Elsevier,Amsterdam, NL, vol. 65, No. 3-4, Jun. 6, 2006, pp. 175-184, XP008001035.

* cited by examiner

ION EXCHANGED SYNTHETIC PHYLLOSILICATE AS SCR CATALYST

CROSS-REFERENCE TO RELATED APPLICATIONS

This application is a national stage filing under 35 U.S.C. 371 of International Patent Application No. PCT/US2016/046745, filed Aug. 12, 2016, which claims priority to U.S. Provisional Application No. 62/205,557, filed on Aug. 14, 2015. The disclosures of each of these applications are hereby incorporated by reference in their entireties.

FIELD OF THE INVENTION

This disclosure relates to catalysts, methods for their manufacture, and methods of treating emissions in an exhaust stream. More particularly, this disclosure relates to SCR catalysts produced from synthetic phyllosilicates, methods for the manufacture of the SCR catalysts, and methods of treating emissions in an exhaust stream with the SCR catalysts.

BACKGROUND OF THE INVENTION

Engine exhaust is a heterogeneous mixture that contains particulate emissions such as soot and gaseous emissions such as carbon monoxide, nitrogen oxides ($NO_x$, e.g., NO and $NO_2$), and/or remaining hydrocarbons as well as condensed phase materials. Catalyst compositions, disposed on one or more substrates, are placed in the engine exhaust system to convert these exhaust components to innocuous compounds. For example, a typical diesel exhaust system can include one or more diesel oxidation catalysts, a soot filter, and a $NO_x$ reduction catalyst.

Ammonia selective catalytic reduction (SCR) is a $NO_x$ abatement technology used to reduce $NO_x$ emissions, particularly in diesel and lean-burn engines. In the SCR process, $NO_x$ emissions are reacted over a catalyst with ammonia (or an ammonia precursor such as urea) to form $N_2$ and $H_2O$. Normally, the SCR catalyst can retain the ammonia during low temperature cycles. However, an increase in exhaust temperature can cause ammonia to desorb from the SCR catalyst and exit the exhaust system to the atmosphere, thereby creating environmental and health concerns. In addition, some SCR systems overdose the amount of ammonia employed in order to increase the $NO_x$ conversion rates which increases the risk of ammonia exiting the exhaust system. Accordingly, a selective ammonia oxidation (AMOx) catalyst is often employed in the SCR system to convert the excess ammonia to $N_2$ before it exits the exhaust system.

Currently, Cu-CHA zeolite catalysts described in U.S. Pat. No. 7,601,662, which is hereby incorporated by reference in its entirety, are the market leaders in SCR catalysts. CHA, short for chabazite, is a zeolite having crystalline Al-substituted silica ($SiO_2$) with ordered 3D structure and 6-member rings. Copper is introduced to the zeolite via ion exchange in order to create the Cu-CHA zeolite SCR catalyst. However, zeolites, such as chabazite, are expensive, thereby increasing the cost of the overall SCR system.

Accordingly, there is a need to find a less expensive and better or equally effective alternative to Cu-CHA zeolite SCR catalysts.

SUMMARY OF THE INVENTION

Described herein are examples of ion-exchanged synthetic phyllosilicates that can catalyze the reaction between ammonia and $NO_x$ gases. In addition, described are methods of making these ion-exchanged synthetic phyllosilicate catalysts, coated substrates that include ion-exchanged synthetic phyllosilicate catalysts, washcoat compositions for preparing coated substrates with ion-exchanged synthetic phyllosilicate catalysts, methods for preparing coated substrates with ion-exchanged synthetic phyllosilicate for use as SCR catalysts, and systems incorporating coated substrates with ion-exchanged synthetic phyllosilicate catalysts in an emission control system.

Some embodiments include a method of preparing a catalyst comprising: synthesizing a phyllosilicate; pillaring the synthesized phyllosilicate; and exchanging a cation present in the synthesized phyllosilicate with one or more metal cations (e.g., including, but not limited to, cations of one or more metals selected from the group consisting of Cu, Fe, Co, Ni, La, Ce, Mn, V, Ag, Ti, and Zr), forming an ion-exchanged, synthesized phyllosilicate. In some embodiments, the synthesized phyllosilicate is hydrothermally synthesized. In some embodiments the metal cation is a copper cation or an iron cation. In some embodiments, the synthesized phyllosilicate has a structure according to formula (2):

$$I_y M_z(Al_m B)(X)_q \qquad (2)$$

wherein I is an interlayer monovalent cation selected from the group consisting of $K^+$, $Na^+$, $Li^+$, $Ca^+$, organic ammonium, $NH_4^+$ and mixtures thereof;

y is 0, 1, 2, 3 or 4;

M is a cation or mixture of cations (e.g., selected from the group consisting of $Zn^{+2}$, $Mg^{+2}$, $Cu^{+2}$, $Fe^{+2}$, $Fe^{+3}$, $Al^{+2}$, $Al^{+3}$, and $Mn^{+2}$);

z is 0, 1, 2, 3 or 4;

q is 2 or 4;

X is a monovalent ion selected from a fluoride ion, hydroxide ion, and mixtures thereof;

B is selected from the group consisting of $Si_3O_{10}$, $Si_2O_{10}$, $Si_2O_5$, and $Si_4O_{10}$; and m is 0, 1, 2, 3 or 4.

In some embodiments, B is $Si_3O_{10}$ and m is 1. In some embodiments, I is organic ammonium or $NH_4^+$.

In some embodiments, the synthesized phyllosilicate is substantially free of alkali metal. In some embodiments the synthesized phyllosilicate has a surface area of at least 25 $m^2/g$. In some embodiments, the pillared, synthesized phyllosilicate has a surface area greater than the surface area of the synthesized phyllosilicate. In some embodiments, the pillared, synthesized phyllosilicate has a surface area of at least 50 $m^2/g$. In some embodiments, the ion-exchanged, synthesized phyllosilicate comprises at least 1 wt. % of one or more metals selected from the group consisting of Cu, Fe, Co, Ni, La, Ce, Mn, V, Ag, Ti, and Zr.

Another aspect of the invention is directed to a catalyst comprising: an ion-exchanged synthetic phyllosilicate, wherein the ion-exchanged synthetic phyllosilicate has been subjected to a pillaring process. In some embodiments, the ion-exchanged synthetic phyllosilicate is produced via hydrothermal synthesis. In some embodiments, the ion-exchanged synthetic phyllosilicate comprises an ion of one or more metals selected from the group consisting of Cu, Fe, Co, Ni, La, Ce, Mn, V, Ag, Ti, and Zr. In some embodiments, the ion is a copper cation or an iron cation. In some embodiments, the ion-exchanged synthetic phyllosilicate is substantially free of alkali metal. In some embodiments, the ion-exchanged synthetic phyllosilicate has a surface area of at least 50 $m^2/g$. In some embodiments, the ion-exchanged synthetic phyllosilicate comprises at least 1 wt. % of the one or more metals selected from the group consisting of Cu, Fe, Co, Ni, La, Ce, Mn, V, Ag, Ti, and Zr.

Another aspect of the invention is directed to a coated substrate comprising: a substrate and an SCR catalyst component deposited thereon, the SCR catalyst component comprising the catalyst of the invention. In some embodiments, the coated substrate of the invention, further comprises an AMOx catalyst component comprising a precious group metal. In some embodiments, the SCR catalyst component and the AMOx catalyst component are deposited on the substrate in a zoned configuration comprising an upstream zone and a downstream zone, wherein the upstream zone comprises the SCR catalyst component and the downstream zone comprises the AMOx catalyst component. In some embodiments, at least a portion of the upstream zone overlaps with at least a portion of the downstream zone.

Another aspect of the invention is directed to a method of making a coated substrate comprising: coating a substrate with a SCR catalyst washcoat comprising the catalyst of the invention; and calcining the coated substrate to afford a dry coated substrate. In some embodiments, the method further comprises coating the substrate with an AMOx catalyst washcoat comprising a precious group metal. In some embodiments, the AMOx catalyst washcoat is coated onto the substrate prior to coating the substrate with the SCR catalyst washcoat. In some embodiments, at least a portion of the SCR catalyst washcoat overlaps at least a portion of the AMOx catalyst washcoat. In some embodiments, the SCR catalyst washcoat and AMOx catalyst washcoat form three zones, wherein a first zone comprises a portion of the SCR catalyst washcoat that does not overlap the AMOx catalyst washcoat, a second zone comprises the portion of the SCR catalyst washcoat that overlaps a portion of the AMOx catalyst washcoat, and a third zone comprises a portion of the AMOx catalyst washcoat that is not overlapped by the SCR catalyst washcoat.

Another aspect of the invention is directed to a method of treating an exhaust gas comprising: contacting a coated substrate as disclosed herein with an exhaust gas comprising $NO_x$. In some embodiments, the coated substrate further comprises an AMOx catalyst component comprising a precious metal. In some embodiments, the exhaust gas contacts the SCR catalyst component before contacting the AMOx catalyst component. In some embodiments, at least a portion of the SCR catalyst component overlaps at least a portion of the AMOx catalyst component. In some embodiments, the SCR catalyst component and AMOx catalyst component form three zones, wherein a first zone comprises a portion of the SCR catalyst component that does not overlap the AMOx catalyst component, a second zone comprises the portion of the SCR catalyst component that overlaps a portion of the AMOx catalyst layer, and a third zone comprises a portion of the AMOx catalyst layer that is not overlapped by the SCR catalyst component. In some embodiments, the exhaust gas contacts the first zone prior to the second zone, and contacts the second zone prior to the third zone.

Another aspect of the invention is directed to a vehicle comprising the coated substrate of the invention. In some embodiments, the coated substrate further comprises an AMOx catalyst component deposited thereon, wherein the AMOx catalyst component comprises a precious group metal. In some embodiments, the SCR catalyst component is upstream of the AMOx catalyst component relative to an exhaust stream from an engine of the vehicle. In some embodiments, at least a portion of the SCR catalyst component overlaps at least a portion of the AMOx catalyst component. In some embodiments, the overlapping SCR catalyst component and AMOx catalyst component form three zones, wherein a first zone comprises a portion of the SCR catalyst component that does not overlap the AMOx catalyst component, a second zone comprises a portion of the SCR catalyst component that overlaps a portion of the AMOx catalyst component, and a third zone comprises a portion of the AMOx catalyst component that is not overlapped by the SCR catalyst component. In some embodiments, the vehicle is a diesel vehicle or a lean-burn vehicle.

Another aspect of the invention is directed to an emission treatment system comprising a conduit for exhaust gas comprising $NO_x$; and the coated substrate of the invention. In some embodiments, the coated substrate further comprises an AMOx catalyst component deposited thereon, wherein the AMOx catalyst component comprises a precious group metal. In some embodiments, the SCR catalyst component is located upstream of the AMOx catalyst component relative to the exhaust gas. In some embodiments, at least a portion of the SCR catalyst component overlaps at least a portion of the AMOx catalyst component. In some embodiments, the SCR catalyst component and AMOx catalyst component form three zones, wherein a first zone comprises a portion of the SCR catalyst component that does not overlap the AMOx catalyst component, a second zone comprises the portion of the SCR catalyst component that overlaps a portion of the AMOx catalyst component, and a third zone comprises a portion of the AMOx catalyst component that is not overlapped by the SCR catalyst component. In some embodiments, the emission treatment system further comprises a diesel oxidation catalyst located upstream of the coated substrate. In some embodiments, the emission treatment system further comprises a catalyzed soot filter between the diesel oxidation catalyst and the coated substrate.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

The term "SCR" can be understood to encompass a selective catalytic reduction in which a catalyzed reaction of nitrogen oxides with a reductant occurs to reduce the nitrogen oxides. "Reductant" or "reducing agent" can be understood to encompass any chemical or compound tending to reduce $NO_x$. In some embodiments, the reducing agent is ammonia. In some embodiments, the reducing agent is an ammonia precursor (e.g., urea). In some embodiments, the reducing agent includes fuel (e.g., diesel fuel) as well as any hydrocarbons and/or oxygenated hydrocarbons.

The term "AMOx" can be understood to encompass a process in which $NH_3$ is reacted with oxygen to produce NO, $NO_2$, $N_2O$, and/or $N_2$.

The term "abate" can be understood to encompass decrease in amount and the term "abatement" can be understood to encompass a decrease in amount, caused by any means.

The terms "exhaust stream" and "engine exhaust stream" can be understood to encompass an engine out effluent as well as an effluent downstream of one or more other exhaust system components including but not limited to an oxidation catalyst and/or soot filter.

By "substantially free of" a specific component in various embodiments, is meant that less than about 5%, less than about 2%, less than about 1%, less than about 0.5%, less than about 0.1%, less than about 0.05%, less than about 0.025%, or less than about 0.01% of the specific particle(s) is present by weight, mass, or concentration. Preferably, "substantially free of" a specific particle(s) indicates that less than about 1% of the specific particle(s) is present by volume, weight, mass, or number of particles.

Additional advantages will be readily apparent to those skilled in the art from the following detailed description. The examples and descriptions herein are to be regarded as illustrative in nature and not restrictive

BRIEF DESCRIPTION OF THE DRAWINGS

Exemplary embodiments are described with reference to the accompanying figures, in which.

DETAILED DESCRIPTION OF THE INVENTION

The inventors have discovered that there is little, if any, evidence that zeolite structure helps with SCR catalysis. Rather, the zeolite structure helps stabilize copper as it is atomically dispersed during ion exchange. Natural mica, a non-zeolite material that is less expensive than zeolites, is a layered silicate that can offer possible Aluminum substitution to provide ionic sites for ion exchange (e.g., Cu and/or Fe ion exchange). However, natural mica has a very low surface area (e.g., less than 5 $m^2/g$) compared to zeolites, making it unsatisfactory as a catalyst. In addition, natural mica is often mined in the presence of sand, kaolin, feldspar, and other silicates that contain various impurities such as iron oxides and heavy metals. Such impurities can actually poison SCR catalytic activity.

Despite the disadvantages in using natural mica as an SCR catalyst, Applicants have discovered that synthetic phyllosilicates, particularly synthetic micas, can be used as an effective SCR catalyst. "Synthetic" refers to a material not formed in nature and thus manmade, e.g., by a controlled reaction such as a hydrothermal reaction. Phyllosilicates can include silicate minerals having tetrahedral silicate groups linked in sheets. These tetrahedral silicate groups can contain four oxygen atoms, three of which are shared with other groups so that the ratio of silicon atoms to oxygen atoms can be two to five. Micas are a subset of phyllosilicates and phlogopites are a subset of micas.

Accordingly, described herein are ion-exchanged synthetic phyllosilicates that can catalyze the reaction between ammonia and $NO_x$ gases. In addition, described are methods of making these ion-exchanged synthetic phyllosilicates, methods of making ion-exchanged synthetic phyllosilicate catalysts, coated substrates that include ion-exchanged synthetic phyllosilicate catalysts, washcoat compositions for preparing coated substrates with ion-exchanged synthetic phyllosilicate catalysts, methods for preparing coated substrates with ion-exchanged synthetic phyllosilicate for use as SCR catalysts, and systems incorporating coated substrates with ion-exchanged synthetic phyllosilicate catalysts in an emission control system.

Phyllosilicate Synthesis

Figure 1:
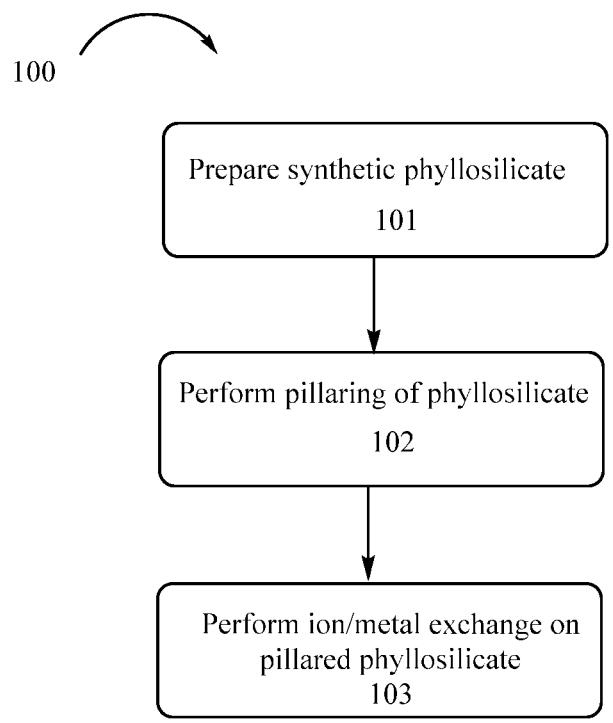
FIG. 1 illustrates a flow chart for production of an ion-exchanged, pillared synthetic phyllosilicate in accordance with some embodiments disclosed herein.

FIG. 1 illustrates method 100 of forming an ion-exchanged synthetic phyllosilicate SCR catalyst. At step 101, a synthetic phyllosilicate is prepared. In contrast to their natural analogues, synthetic phyllosilicates have reduced or are substantially free from impurity contamination. Synthesis of phyllosilicates can be carried out according to various techniques known in the art. However, Applicants have discovered that synthetic phyllosilicates, particularly synthetic micas, prepared via hydrothermal synthesis can have a high surface area (e.g., about 50 $m^2/g$) or high aspect ratio making them suitable for use in catalysts.

Hydrothermal synthesis typically refers to a process that allows platelets (i.e., diameter greater than thickness) of material to grow in a solvent (e.g., water) at temperatures and pressures which allow for at least partial dissolution or dispersion of precursor materials.

Hydrothermal synthesis often includes hydrothermally treating a reaction mixture (i.e., a slurry, a solution, a dispersion or a gel in a solvent) of the precursor components needed for the preparation of the synthetic phyllosilicate. Generally, the solvent content during hydrothermal synthesis varies from about 60 to about 98 wt. % based on the total weight of the reaction mixture. As such, the reagents of the reaction mixture range from about 2 to about 40 wt. %, from about 4 to about 35 wt. %, or from about 5 to about 30 wt. % based on the total weight of the reaction mixture.

In some embodiments, the reaction mixture is hydrothermally treated under basic conditions. In some embodiments, the reaction mixture can be basic with a typical pH from about 9 to about 14, about 12 to about 14, or about 12.5 to about 14. In some embodiments, the reaction mixture is hydrothermally treated at a temperature ranging from about 110° C. to about 250° C. or about 150° C. to about 225° C. In some embodiments, the reaction mixture is hydrothermally treated at a gauge pressure ranging from about 50 to about 400 psi, about 75 to about 300 psi, about 85 to about 250 psi, or about 100 to about 220 psi. The conditions for hydrothermal synthesis are held for as short as hours or as long as weeks. For example, in some embodiments the conditions for hydrothermal synthesis are held for about 2 to about 100 hours, about 10 to about 90 hours, or about 20 to about 85 hours. In addition, the hydrothermal process can be done under static or stirring/mixing conditions.

Hydrothermally treating the reaction mixture generally forms a platelet. A reaction vessel used during the hydrothermal reaction is sealed or non-sealed. In some embodiments, the formed platelet is isolated by processes known by those of ordinary skill in the art.

In some embodiments, seeding of the hydrothermal reaction can be desirable with a previously formed phyllosilicate. The amount of seeding in the reaction mixture ranges from about 0.1 to about 10 wt. %, about 0.5 to about 8 wt. %, or about 1 to about 6 wt. % of the theoretical product formed.

The reagents of the reaction mixture can vary depending on the synthetic phyllosilicate to be formed. Accordingly, depending on the particular synthetic phyllosilicate to be formed, reagents known by those of ordinary skill in the art can be used. In addition, hydrothermal synthesis is carried out under stoichiometric conditions or non-stoichiometric conditions. For example, stoichiometric conditions refers to when the molar amount of starting materials present at the beginning of the reaction is the same as the molar amount of the product being formed, e.g., the molar ratio of starting material to product is about 1:1.

In addition, the reaction mixture in some embodiments includes a habit modifier. A habit modifier is a compound that can more readily react with particular faces of a phyllosilicate crystal in a preferred manner over other faces of the phyllosilicate crystal. As such, a habit modifier alters the growth rates of those favored faces relative to the other faces, which determines the overall shape of the crystal. The habit modifiers used in the reaction mixture are typically habit modifiers known by those of ordinary skill in the art. Exemplary habit modifiers include acids (and/or hydrates or salts thereof), chelating agents, surfactants, sugars, or alkyl polyglycoside.

Certain exemplary acids (and/or hydrates or salts thereof) include, for example, carboxylic acids (such as formic acid, acetic acid, ascorbic acid, benzoic acid, oxalic acid, malonic acid, succinic acid, lactic acid, aspartic acid, glutaric acid, adipic acid, pimelic acid and phthalic acid), oxycarboxylic acids (such as lactic acid, maleic acid, tartaric acid and citric acid), amino acids (such as glycine, alanine, valine, leucine, tyrosine, thoreonine, serine, proline, triptophane, methionine, cysteine, thyroxine, asparagine, glutamic acid, lysine and alginine) and/or hydrates and salts thereof.

Certain exemplary chelating agent include nitrotriacetic acid, 1,2-diaminocyclohexane-tetraacetic acid, N-oxyethylene ethylenediaminetriacetic acid, ethyleneglycolbis-tetraacetic acid, ethylenediamine tetrapropionic acid or salts thereof.

Certain exemplary surfactants include cationic, anionic, or nonionic surfactants. For example, in some embodiments, the surfactant is a polyalkylene oxide available from BASF Corporation under the tradename Pluronic®. In addition, in other embodiments, alkyl polyglucosides sold under the tradename Glucopon® are used as the habit modifier.

In some embodiments, the habit modifier is a weak organic or inorganic acid, hydrate or salt thereof, or a sugar. Specifically, the weak organic acid or salt or hydrate thereof, as a habit modifier can be defined by formula (1):

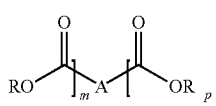

(1)

In some such embodiments, m+p is 1;

A is a branched or unbranched, substituted or unsubstituted $C_1$-$C_{10}$ alkyl, branched or unbranched, substituted or unsubstituted $C_2$-$C_{10}$ alkenyl, substituted or unsubstituted $C_7$-$C_9$ phenylalkyl or substituted or unsubstituted $C_5$-$C_{10}$ aryl, wherein the linear or branched substituted $C_1$-$C_{10}$ alkyl and the linear or branched substituted $C_2$-$C_{10}$ alkenyl is substituted by one or more functional groups selected from C(O)OH, C(O)O—X($^+$)$_n$, $NH_2$, halogen, OH, and —C(O)H or is interrupted by —O—, —$NR^2$—, or —C(O)—; wherein the substituted $C_7$-$C_9$ phenylalkyl or the substituted $C_5$-$C_{10}$ aryl is substituted by one or more functional groups selected from C(O)OH, C(O)O—X($^+$)$_n$, $NH_2$, halogen, OH, and —C(O)H;

R is hydrogen or $R^1O$, wherein $R^1O$ is —X($^+$)$_n$;

$R^2$ is a hydrogen or a linear or branched $C_1$-$C_{10}$ alkyl, optionally substituted with one or more substituents selected from C(O)OH, C(O)O—X($^+$)$_n$, halogen, $NH_2$, —C(O)—, and OH;

wherein n is an integer from 1-3; and

X($^+$)$_n$ is a cation and X($^{C+}$)$_n$ is an organic or inorganic cation.

Exemplary organic or inorganic cation include but are not limited to for example ammonium, substituted ammonium (such as methylammonium, dimethylammonium, trimethylammonium, and ethanolammonium) metal cations (such as alkali metal cation, alkaline earth metal cation, or other metal cations including $Na^+$, $K^+$, $Cs^+$, $Rb^+$, $Fr^+$, $Li^+$, $M^{2+}$, $Sr^{2+}$, $Ba^{2+}$, $Be^{2+}$, $Ca^{2+}$, $Al^{3+}$, $B^{3+}$, or $P^{3+}$).

In other embodiments, m+p is 2 or more;

A is branched or unbranched, substituted or unsubstituted $C_1$-$C_{10}$ alkylene, branched or unbranched, substituted or unsubstituted $C_2$-$C_{10}$ alkylidene, substituted or unsubstituted $C_7$-$C_9$ alkylphenylene or $C_6$-$C_{10}$ arylene;

wherein the substituted $C_7$-$C_9$ alkylphenylene or the substituted $C_6$-$C_{12}$ arylene is substituted by one or more functional groups selected from $NHR^2$, OH, COOH, halogen, C(O)O—X($^{C+}$)$_n$, and —C(O)H;

wherein the substituted linear or branched $C_1$-$C_{10}$ alkylene, or the substituted linear or branched $C_2$-$C_{10}$ alkylidene is substituted by one or more functional groups selected from C(O)OH, C(O)O—X($^{C+}$)$_n$, $NH_2$, halogen, OH, and —C(O)H and/or is interrupted by —O—, —$NR^2$, or —C(O)—; and wherein R, $R^1O$, $R^2$, and X($^{C+}$)$_n$ are the same as defined above.

A $C_1$-$C_{10}$ alkyl having up to 10 carbon atoms can be a branched or unbranched radical; for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, nonyl, and decyl.

A $C_2$-$C_{10}$ alkenyl having up to 10 carbons can include at least one unsaturated carbon-carbon bond. For example, alkenyl can be a version of alkyl, for example isopropenyl, propenyl, hexenyl, heptenyl, and the like.

A $C_7$-$C_9$ phenylalkyl is, for example, benzyl, α-methylbenzyl, a, α,α-dimethylbenzyl or 2-phenylethyl. A $C_6$-$C_{10}$ aryl is, for example, phenyl or naphthyl as well as substituted $C_6$-$C_{10}$ aryl such as substituted phenyl or naphthyl with at least one substituent selected from hydroxyl, halogen, $NH_2$, C(O)H, COOH, and C(O)O—X($^+$)$_n$. These include, for example, benzoic acid, phthalic acid, and terephthalic acid or halogen substituted benzoic acid. A $C_1$-$C_{10}$ alkylene is a branched or unbranched radical, for example methylene, ethylene, propylene, trimethylene, tetramethylene, pentamethylene, hexamethylene, heptamethylene, octamethylene, decamethylene, dodecamethylene, or octadecamethylene.

A $C_2$-$C_{10}$ alkylene is optionally interrupted by oxygen, $NR^2$, or C(O); for example, —$CH_2$—O—$CH_2$—, —$CH_2$—$NR^2$—$CH_2$—, —$CH_2N(CH_3)$—$CH_2$—, —$CH_2$—O—$CH_2$—$CH_2$—O—$CH_2$—, —$CH_2$—(O—$CH_2CH_2$—)$_{10}$—

—$CH_2$—, —$CH_2$—(O—$CH_2CH_2$—$)_3$O—$CH_2$—, —$CH_2$—(O—$CH_2CH_2)_4$O—$CH_2$—, —$CH_2CH_2$—N($CH_2CH_2OH$)—$CH_2CH_2$—, —$CH_2CH_2C(O)CH_2)_2CH_3$.

A $C_2$-$C_{10}$ alkylidene having 2 to 20 carbon atoms is, for example, ethylidene, propylidene, butylidene, pentylidene, 4-methylpentylidene, heptylidene, nonylidene, tridecylidene, nonadecylidene, 1-methylethylidene, 1-ethylpropylidene, or 1-ethylpentylidene.

A $C_7$-$C_9$ alkylphenylene is, for example, $CH_2$-Ph-$CH_2$ (Ph is phenyl) or $CH_2CH_2Ph$-$CH_2$.

A $C_6$-$C_{12}$ arylene is, for example,

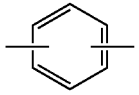

Suitable weak organic acid habit modifiers include, but are not limited to, formic acid, acetic acid, acrylic acid, oxalic acid, benzoic acid, phthalic acid, isothalic acid, terephthalic acid, malonic acid, sorbic acid, ascorbic acid, methyl malonic acid, succinic acid, lactic acid, aspartic acid, glutaric acid, adipic acid, pimelic acid, malic acid, maleic acid, tartaric acid, tartronic acid, mucic acid, gluconic acid, citric acid, isocitric acid, acetyl citric acid, suberic acid, sebacic acid, azelaic acid, 1,2,3-propanetricarboxylic acid, 1,1, 3,3-propanetetracarboxylicacid, 1,1,2,2-ethane tetracarboxylic acid, 1,2,3,4-butantetetracarboxylic acid, 1,2,2,3 propanetetracarboxylic acid, 1,3,3,5 pentanetetracarboxylic acid, ethylenediamine tetraacetic acid, ethyleneglycolbistetraacetic acid, diglycolic acid, ethylenediamine tetrapropionic acid, iminodiacetic acid, 1,2-propylenediaminetetraacetic acid, N-methyl,-ethyl,-propyl- and -butyl iminodiacetic acid, 1,3-propylenediaminetetraacetic acid, N-hydroxyethylethylenediaminetriacetic acid, triethylenetetraminehexaacetic acid, diethylenetriaminepentaacetic acid, amino acids such as glycine, alanine, valine, leucine, tyrosine, thoreonine, serine, glutamic acid, lysine, and salts or hydrates thereof. Weak inorganic acid habit modifiers include, for example, boric acid, phosphoric acid, pyrophosphate, and salts or hydrates thereof.

Exemplary sugars that can be used as habit modifiers include, but are not limited to, mono- and disaccharides. For example, glucose, fructose, galactose, sucrose, maltose, sorbitol, lactose mannitol, inositol, xylitol, threitol, erythritol, adonitol (ribitol), arabitol (lyxitol), dulcitol (galactitol), maltitol, isomalt, ribose, xylose and mannose.

In some embodiments, the amount of habit modifier used in the reaction mixture ranges from about 0.5 to about 10% mmol, from about 1 to about 7% mmol, or from about 1.5 to about 5% mmol based on the theoretical calculated yield of product. In some embodiments, the habit modifier is a surfactant, wherein the amount required during the hydrothermal synthesis ranges from about 0.01 to about 0.3 wt. % or from about 0.02 to about 0.15 wt. % based on the theoretical calculated yield of product.

The disclosed habit modifiers are used to alter the average aspect ratio (diameter over thickness) and/or average surface area ($m^2/g$) of any of the following non-exhaustive list of micas/clays:

phlogopite (e.g., $KMg_3(AlSi_3O_{10})(F,OH)_2$, $KZn_3(AlSi_3O_{10})(F,OH)_2$)
annite (e.g., $KFe_3(AlSi_3O_{10})(OH,F)_2$),
clintonite (e.g., $Ca(Mg, Al)_3Al_3SiO_{10}(OH)_2$,
siderophyllite (e.g., $KFe_2Al(Al_2Si_2)O_{10}(F,OH)_2$),
easonite (e.g., $KMg_2Al(Si_2Al_2)O_{10}(OH)_2$),
paragonite (e.g., $NaAl_2(AlSi_3O_{10})(OH,F)_2$),
margarite (e.g., $CaAl_2(Al_2Si_2)O_{10}(OH)_2$),
lepidolite (e.g., $KLi_2Al(AlSi_3)O_{10}(F,OH)_2$),
muscovite (e.g., $KAl_2(AlSi_3O_{10})(OH,F)_2$),
biotite (e.g., $K(Mg,Fe)_3AlSi_3O_{10}(OH,F)_2$),
aspidolite (e.g., $NaMg_3AlSi_3O_{10}(OH)_2$),
celadonite (e.g., $K(Mg, Fe^{+2})Fe^{+3}(Si_4O_{10})(OH)_2$),
ephesite (e.g., $LiNaAl_2(Al_2Si_2)O_{10}(OH)_2$),
ferro-aluminoceladonite (e.g., $K(Fe^{+2}, Mg)(Al, Fe^{+3})(Si_4O_{10})(OH)_2$),
ferro-celadonite (e.g., $K(Fe^{+2},Mg)(Fe^{+3}, Al)(Si_4O_{10})(OH)_2$),
glauconite (e.g., $(K,Na)(Fe^{+3}Al,Mg)_2(Si,Al)_4O_{10}(OH)_2$),
hendricksite (e.g., $K(Zn,Mg,Mn)AlSi_3O_{10}(OH)_2$),
illite (e.g., $(K, H_2O)(Al, Mg, Fe)_2(Si, Al)_4O_{10}(OH)_2$, $K_{0.65}Al_2(Al_{0.65}Si_{3.35}O_{10})(OH)_2$)
norrishite (e.g., $KLiMn_2^{+3}(Si_4O_{10})O_2$),
montdorite (e.g., $(K, Na)_2(Fe^{+2}, Mn^{+2}, Mg)_5(Si_4O_{10})_2(OH,F)_4$,)
polylithionite (e.g., $KLi_2Al(Si_4O_{10})(F,OH)_2$),
preiswerkite (e.g., $NaMg_2Al_3Si_2O_{10}(OH)_2$),
shirokshinite (e.g., $KNaMg_2(Si_4O_{10})F_2$),
shirozulite (e.g., $K(Mn^{+2},Mg)_3(AlSi_3)O_{10}(OH)_2$),
tainiolite (e.g., $KLiMg_2(Si_4O_{10})F_2$),
tetraferriphlogopite (e.g., $KMg_3(Fe^{+3}, Si_3O_{10})(OH,F)_2$),
trilithionite (e.g., $K(Li,Al)_3AlSi_3O_{10}(F,OH)_2$),
yangzhumingite (e.g., $KMg_{2.5}(Si_4O_{10})F_2$),
zinwaldite (e.g., $KLiFe^{+2}Al(AlSi_3O_{10})(F,OH)_2$),
  halloysite (e.g., $Al_2(Si_2O_5)(OH)_4$),
kaolinite (e.g., $Al_2Si_2O_5(OH)_4$),
montmorillonite (e.g., $(Na, Ca)_{0.33}(Al,Mg)_2Si_4O_{10}(OH)_2 \cdot n H_2O$),
vermiculite (e.g., $(Mg,Fe^{+3},Fe^{+2})_3[(Al,Si)_4O_{10}](OH)_2 \cdot 4H_2O$,
talc (e.g., $Mg_3Si_4O_{10}(OH)_2$),
sepiolite (e.g., $Mg_4Si_6O_{15}(OH)_2 \cdot 6H_2O$),
palygorskite (e.g., $(Mg, Al)_2Si_4O_{10}(OH) \cdot 4H_2O$), and
pyrophyllite (e.g., $Al_2Si_4O_{10}(OH)_2$).

In some embodiments, the hydrothermally synthesized phyllosilicates, particularly hydrothermally synthetic micas have an aspect ratio of at least about 50, at least about 150, at least about 500, at least about 1000, at least about 1500, or at least about 2000, wherein the aspect ratio is determined by the diameter divided by the thickness of the platelet. The thickness of a platelet is understood to be the minimum dimension. In some embodiments, the aspect ratio ranges from about 50 to about 2000, about 100 to about 2000, or about 150 to about 1500.

In some embodiments, the average surface areas of the hydrothermally synthesized phyllosilicates, particularly hydrothermally synthetic micas, are at least about 25 $m^2/g$, at least about 30 $m^2/g$, at least about 35 $m^2/g$, at least about 40 $m^2/g$, at least about 45 $m^2/g$, or at least about 50 $m^2/g$.

In some embodiments, the diameter of the hydrothermally synthesized phyllosilicates, particularly hydrothermally synthetic micas, is at least about 4 microns, at least about 7 microns, at least about 10 microns, at least about 50 microns, at least about 75 microns, or at least about 1 mm. In some embodiments, the diameter ranges from about 4 microns to about 1 mm, from about 5 microns to about 1 mm, from about 6 microns to about 60 microns, or from about 6 microns to about 50 microns.

In some embodiments, the average thickness of the hydrothermally synthesized phyllosilicates, particularly hydrothermally synthetic micas, is at most about 500 nm, at most about 400 nm, at most about 200 nm, at most about 150 nm, at most about 100 nm, at most about 80 nm, or at most about 50 nm. In some embodiments, the average thickness ranges from about 10 nm to about 500 nm, about 20 nm to about 400 nm, about 10 nm to about 150 nm, about 15 nm to about 100 nm, or about 15 nm to about 80 nm.

Furthermore, the aspect ratio, the diameter, and the average surface area can be increased and the average thickness decreased of the hydrothermally synthesized phyllosilicates by optimizing the hydrothermal synthesis conditions. The diameter is typically measured by the $D_{50}$ of a particle size distribution determined via static light scattering, e.g., using a Malvern Mastersizer® Hydo2000S. The average thickness is typically measured via cross sectional Scanning Electron Microscope (SEM). In addition, the hydrothermally synthesized phyllosilicates can be classified by means of various methods known by those of ordinary skill in the art, such as gravity sedimentation, sedimentation in a decanter, sieving, use of a cyclone or hydrocyclone, spiral classifying, or a combination of these methods. In addition, the classification method can also be used in a plurality of successive steps. The classification of the hydrothermally synthesized phyllosilicates can shift the distribution toward larger or smaller diameters.

In some embodiments, the synthetic mica has a structure represented by formula (2):

$$I_y M_z (Al_m B)(X)_q \qquad (2)$$

wherein I is an interlayer monovalent cation selected from the group consisting of $K^+$, $Na^+$, $Li^+$, $Ca^+$ organic ammonium (e.g., tetra methyl ammonium ($N(CH_4)^+$), $NH_4^+$ and mixtures thereof;

y is 0, 1, 2, 3 or 4;

M is a cation or mixture of cations (e.g., selected from the group consisting of $Zn^{+2}$, $Mg^{+2}$, $Cu^{+2}$, $Fe^{+2}$, $Fe^{+3}$, $Al^{+2}$, $Al^{+3}$, and $Mn^{+2}$);

z is 0, 1, 2, 3 or 4;

q is 2 or 4;

X is a monovalent an ion such as fluoride, hydroxide, or mixtures thereof;

B is selected from the group consisting of $Si_3O_{10}$, $Si_2O_{10}$, $Si_2O_5$, and $Si_4O_{10}$; and m is 0, 1, 2, 3 or 4.

In some embodiments, B is $Si_3O_{10}$ and m is 1.

In some embodiments, compounds of formula (2) are hydrates.

The synthetic mica of formula (2) can be prepared by hydrothermally treating a reaction mixture that includes: (1) at least an I source selected from the group consisting of $K^+$, $Na^+$, organic ammonium (e.g., tetra methyl ammonium), $NH_4^+$, and $Li^+$; (2) an M or metal source selected from the group consisting of zinc source, magnesium source, manganese source, copper source, iron source and mixtures thereof; (3) an aluminum source; and (4) a silicon source. In some embodiments, the reaction mixture includes a habit modifier as described above. In addition, in some embodiments, the reaction mixture includes a monovalent anion source such as a fluoride source, a hydroxide source, or a combined fluoride and hydroxide source. In some embodiments, the reaction mixture can include seed crystals of the preformed phyllosilicate. In some embodiments, the I source is a base. For example, bases that provide $K^+$, $Na^+$, organic ammonium (e.g., tetra methyl ammonium), $NH_4^+$, and $Li^+$ include potassium hydroxide, sodium hydroxide, sodium oxide, lithium hydroxide, ammonium hydroxide, sodium carbonate, lithium carbonate, lithium oxide, potassium carbonate, and potassium oxide. Alternatively or simultaneously, in some embodiments, the I source comprises one or more sources selected from the group consisting of aluminum, silicon, and a M source. In some embodiments, the base is, for example, derived from common inorganic bases such as potassium hydroxide, sodium hydroxide, lithium hydroxide, sodium carbonate, lithium carbonate, ammonium hydroxide, and potassium carbonate, and organic bases such as tripropylammonium hydroxide, tetramethyl ammonium hydroxide, triethanolamine, and diethanolamine. In some embodiments, the base provides the hydroxide source. In addition, in some embodiments, the fluoride source is selected from HF, $NH_4F$, NaF, $K_2SiF_6$, KF, and $MgF_2$.

In some embodiments, the aluminum source is selected from elemental aluminum $Al^0$, salts of aluminum (organic or inorganic), or oxides and/or hydrates thereof. For example, in some embodiments, the aluminum source is selected from the group consisting of $Al(NO_3)_3$, $K_2Al_3O_4$, $Na_2Al_3O_4$, $Al(OH)_3$, $Al_3O_4$, $Al_3O_4$, pseudoboehmite, aluminum isopropoxide, $Al(C_2H_3O_2)_3$, $AlBr_3$, $AlCl_3$, $AlF_3$, $Al_2(C_6H_5O_7)$, $Al_2(SO_4)_3$, AlOOH, and hydrates thereof.

In some embodiments, the silicon source can be derived from hydrates of $SiO_2$, colloidal $SiO_2$, sodium metasilicate, sodium silicate, potassium metasilicate, potassium silicate, lithium metasilicate, lithium silicate, kaolin, fumed silica, talc, $H_2SiO_3$, and tetraethyl orthosilicate. The metal M as explained above is selected from a group consisting of any zinc, magnesium, manganese, copper, iron source or mixtures thereof. In some embodiments, the zinc source can be elemental, any salt (organic or inorganic), hydrate, or oxide thereof. For example, the zinc source can be selected from the group consisting of $Zn^0$, $ZnSO_4$, $Zn(NO_3)_2$, $ZnCl_2$, $Zn(C_2H_3O_2)_2$, $ZnCO_3$, $Zn(CH_3O_2)_2$, $ZnBr_2$, zinc oxide, and hydrates thereof.

In some embodiments, the magnesium source can be elemental magnesium, any salt (organic or inorganic), hydrate or oxide thereof. For example, the magnesium source is selected from the group consisting of talc, magnesium oxide, $MgCl_2$, $Mg(NO_3)_2$, $Mg(OH)_2$, $MgSO_4$, $Mg(ClO_2)_2$, $Mg(NO_3)_2$, $MgSO_4$ and hydrates thereof.

In some embodiments, the copper source can be elemental copper, any salt (organic or inorganic) hydrate or oxide thereof. For example, the copper source is selected from the group consisting of copper carbonate, copper oxide, $Cu(C_2H_3O_2)_2$, $CuBr_2$, $CuCl_2$, $Cu(CHO_2)_2$, $Cu(NO_3)_2$, $CuSO_4$ and hydrates thereof.

In some embodiments, the manganese source can be elemental manganese, any salt (organic or inorganic), hydrate or oxide thereof. For example, the manganese source can be $Mn^0$, $MnCl_2$, $Mn(NO_3)_2$, manganese carbonate, manganese oxide, $MnSO_4$ and hydrates thereof.

Figure 2:
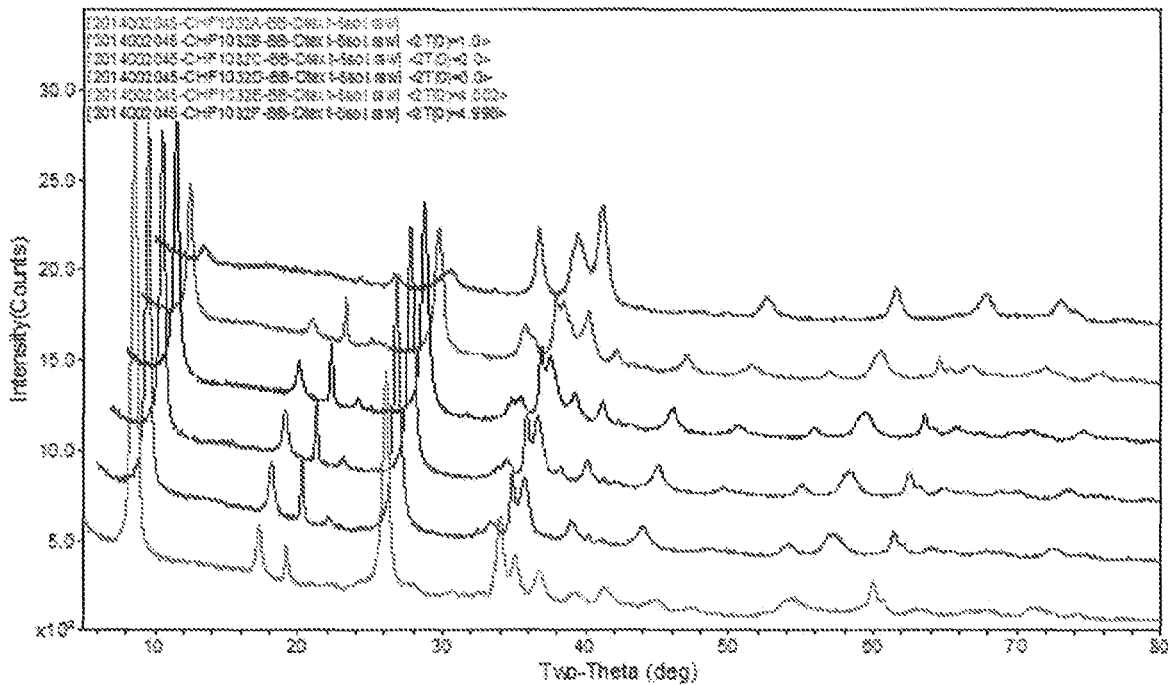
FIG. 2 illustrates an X-Ray diffraction pattern of a synthetic mica upon calcination at 600° C., 650° C., 700° C., 750° C., 800° C., and 850° C., wherein the synthetic mica was prepared in accordance with some embodiments disclosed herein.

Non-limiting examples of synthetic micas prepared via hydrothermal synthesis can be found in U.S. Patent Application Publication No. 2014/0251184, which is hereby incorporated by reference in its entirety. Applicants performed calcination of a synthetic mica $KZn_3(AlSi_3O_{10})(OH)_2$ prepared by the above hydrothermal process at 600, 650, 700, 750, 800, and 850° C. The results are illustrated in FIG. 2. As shown in FIG. 2, the synthetic mica remained thermally stable up to 750° C. At temperatures higher than 750° C., ZnO started to form.

Pillaring of Synthetic Phyllosilicate

Step 102 of method 100 as shown in FIG. 1 includes performing a pillaring process on a prepared synthetic phyllosilicate. Because the synthetic phyllosilicate may not have the desired surface area and/or aspect ratio for use as an SCR catalyst (including synthetic phyllosilicates prepared via hydrothermal synthesis with a habit modifier), a pillaring process can be performed on the synthetic phyllosilicate. The pillaring of synthetic phyllosilicates can be carried out according to various techniques known in the art.

The pillaring process can include exfoliating the phyllosilicate or mica layers using large molecules or colloidal clusters to improve the surface area and/or aspect ratio of the phyllosilicate. In addition, the pillaring process also encompasses an intercalation step. Various pillaring processes are described in "Recent Advances in the Synthesis and Catalytic Applications of Pillared Clays, Catalysis Reviews: Science and Engineering", 42:1-2, 145-212 (200) by A. Gil, L. Gandia, & M. Vicente, which is hereby incorporated by reference in its entirety.

Figure 3:
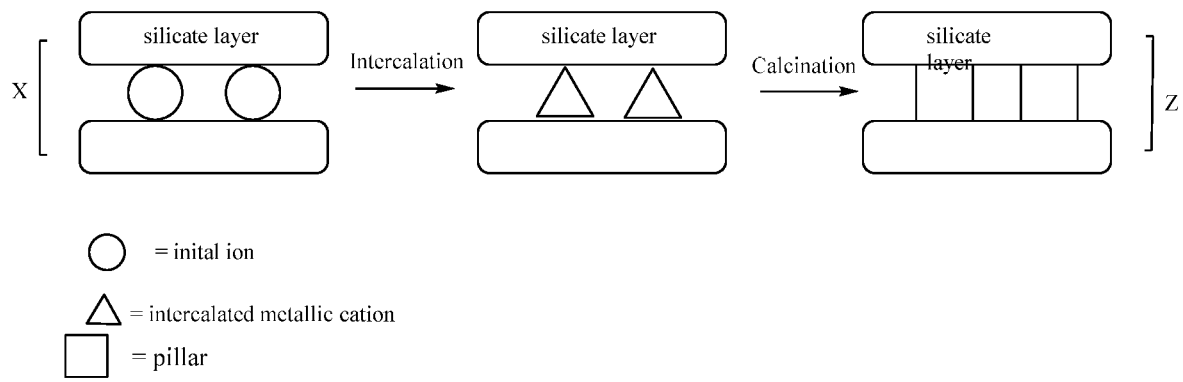
FIG. 3 illustrates a schematic representation of a pillaring process.

A schematic representation of a pillaring process is illustrated in FIG. 3. During the exemplary pillaring process, a suspension containing a layered synthetic phyllosilicate is mixed with a solution containing a polycation. The polycation solution can be partially hydrolyzed and aged in order to polymerize a multivalent cation. A reaction between the polycation and the synthetic phyllosilicate, including the substitution of the exchangeable cations in the interlayer space of the phyllosilicate by the polycations, can be referred to as a cationic exchange reaction or intercalation. After the reaction, the resulting suspension can be separated and washed, giving rise to the intercalated phyllosilicate. Subsequent calcination can stabilize the polymeric cation, thereby preventing the collapse of the interlayer space and generating a stable porous structure. A great variety of factors can influence the pillaring process. The overall SCR performance of a pillared synthetic phyllosilicate used in an SCR composition can be improved by using SCR promoters as pillaring components.

After the pillaring process, the surface area and/or aspect ratio of the synthetic phyllosilicate can be greater than the surface area and/or aspect ratio of the original synthetic phyllosilicate. For example, the average surface area after pillaring in some embodiments is at least about 50 $m^2/g$, at least about 60 $m^2/g$, at least about 70 $m^2/g$, at least about 80 $m^2/g$, at least about 90 $m^2/g$, at least about 100 $m^2/g$. In some embodiments, the average surface area after pillaring is about 50-100 $m^2/g$.

Ion Exchange of Synthetic Phyllosilicate

Step 103 of method 100 as shown in FIG. 1 includes performing an ion exchange on a synthetic phyllosilicate. Specifically, a cation of the synthetic phyllosilicate can be exchanged with a cation from one or more of the groups IIIB, IVB, VB, VIB, VIIB, VIIIB, IB, or IIB of the periodic table including copper, iron, and mixtures or combinations thereof (e.g., "Cu and/or Fe" or "copper and/or iron"). In some embodiments, the cation of the synthetic phyllosilicate can be exchanged with a cation of a metal selected from Cu, Fe, Co, Ni, La, Ce, Mn, V, Ag, Ti, Zr and combinations thereof. This is often referred to as ion exchange or metal exchange. In some embodiments, the pillaring process is not performed and the ion exchange is performed on the synthetic phyllosilicate itself. In some embodiments, the pillaring process includes the ion exchange process in the intercalation step of the pillaring process (i.e., step 102 and step 103 can effectively be the same step). In some embodiments, the ion exchange of the synthetic phyllosilicate is performed prior to the pillaring process (i.e., step 103 is interchangeable with step 102).

It has previously been discovered that copper and iron exchanged zeolites (specifically Cu-CHA) can display excellent SCR activities due to these metals at the exchange sites. Applicants have discovered that the cations of synthetic phyllosilicates can also be exchanged with a metal selected from Cu, Fe, Co, Ni, La, Ce, Mn, V, Ag, Ti, Zr and combinations thereof. In some embodiments, the cations of synthetic phyllosilicates can also be exchanged with a metal selected from groups IIIB, IVB, VB, VIB, VIIB, VIIIB, IB, and IIB of the periodic table including copper and/or iron. The ion exchange process of a synthetic phyllosilicates is carried out in the same fashion as a copper and $NH_4$ ion exchange procedure using a synthetic mica prepared by hydrothermal synthesis with the chemical composition of $KZn_3(AlSi_3O_{10})(OH)_2$. Specifically, the inventors synthesized two micas (i.e., Mica 1 and Mica 2) and performed a copper ion exchange and $NH_4$ ion exchange on the two synthesized micas to produce two copper exchanged synthetic micas (i.e., Cu-Mica 1 and Cu-Mica 2) and two $NH_4$ exchanged synthetic micas (i.e., $NH_4$-Mica 1 and $NH_4$-Mica 2).

Synthesis of Mica 1: 481.16 grams of a 16M KOH solution, 1024.83 grams of water, 29.11 grams of a 50 wt. % potassium aluminate solution, 66.51 grams of a 40 wt. % colloidal silica solution, 127.43 grams of zinc sulfate heptahydrate, and 1.73 grams of a sodium citrate were mixed together to form a gel. The gel was placed in a 2 L Parr autoclave reactor, sealed, and heated at 170° C. for 48 hours. The reactor was stirred at a rate of 500 rpm. After 48 hours, the reactor was cooled to room temperature, and the reaction mixture was filtered, washed with double distilled (DI) water, and dried, yielding a white powder.

Synthesis of Mica 2: 535.42 grams of a 16M KOH solution, 1140.41 grams of water, 32.40 grams of a 50 wt. % potassium aluminate solution, 74.01 grams of a 40 wt. % colloidal silica solution, 141.81 grams of zinc sulfate heptahydrate, and 0.967 grams of sodium citrate were mixed together to form a gel. The gel was placed in a 2 L Parr autoclave reactor, sealed, and heated at 170° C. for 12 hours. The reactor was stirred at a rate of 200 rpm. After 12 hours, the reactor was cooled to room temperature, and the reaction mixture was filtered, washed with DI water, and dried, yielding a white powder.

Synthesis of $NH_4$-Mica 1: 10 g Mica 1 was suspended in a $NH_4NO_3$ solution (2.4 M, 200 mL) and heated to 80° C. for 12 hrs. The exchanged samples were filtered, washed with 600 mL double distilled (DI) $H_2O$, and dried in air to obtain a fine powder. Powders were further dried at 130° C. for 6 hrs.

Synthesis of $NH_4$-Mica 2: 10 g Mica 2 was suspended in a $NH_4NO_3$ solution (2.4 M, 200 mL) and heated to 80° C. for 12 hrs. The exchanged samples were filtered, washed (600 mL DI $H_2O$), and dried in air to obtain a fine powder. Powders were further dried at 130° C. for 6 hrs.

Synthesis of Cu-Mica 1: 10 g mica-1 was suspended in a $Cu(OAc)_2$ solution (0.5 M, 200 mL) and heated to 50° C. for 2 hrs. The exchanged samples were filtered, washed with 600 mL DI $H_2O$, and dried in air to obtain a fine powder. Powders were further dried at 130° C. for 2 hrs and calcined at 500° C. for 2 hrs (2° C./min).

Synthesis of Cu-Mica 2: 10 g Mica 2 was suspended in a $Cu(OAc)_2$ solution (0.5 M, 200 mL) and heated to 50° C. for 2 hrs. The exchanged samples were filtered, washed with 600 mL DI $H_2O$, and dried in air to obtain a fine powder. Powders were further dried at 130° C. for 2 hrs and calcined at 500° C. for 2 hrs (2° C./min).

The following Table 1 shows the elemental analysis obtained via ICP of the non-exchanged and ion-exchanged synthetic mica.

TABLE 1

| | Non-Exchanged | | Cu Exchanged | | NH4 Exchanged | |
|---|---|---|---|---|---|---|
| | Mica 1 | Mica 2 | Cu-Mica 1 | Cu-Mica 2 | NH4-Mica 1 | NH4-Mica 2 |
| Al | 5.2 | 4.3 | 3.7 | 4.6 | 4.8 | 4.9 |
| K | 7.8 | 15.3 | 6.4 | 9.8 | 6.2 | 7.6 |
| Na | 0.0 | 0.1 | 0.0 | 0.0 | 0.0 | 0.0 |
| Zn | 36.0 | 31.6 | 33.6 | 26.3 | 31.9 | 31.5 |
| Cu | | | 2.8 | 7.0 | | |

As shown in the above Table 1, Applicants discovered that copper can be successfully exchanged for the potassium of the synthetic phyllosilicate. Because the mica of Table 1 incorporates individual anionic Al sites at the tetrahedral position and the charge balance component includes the K cation filled between structural layers, the K cation can be exchanged with other metal cations (e.g., Cu and/or Fe) via ion exchange. In addition, the copper remained atomically dispersed in the Cu-Mica 1 & Cu-Mica 2 samples.

Since alkali metals can reduce or poison SCR activity, after ion exchange, the ion-exchanged synthetic phyllosilicate can be substantially free of alkali metal. In addition, to avoid alkali metal in its entirety, the starting synthetic phyllosilicate prior to ion exchange can be an alkali-free synthetic phyllosilicate.

In some embodiments, the ion-exchanged synthetic phyllosilicate comprises at least about 1 wt. %, at least about 1.5 wt. %, or at least about 2 wt. % of one or more of Cu, Fe, Co, Ni, La, Ce, Mn, V, Ag, Ti, Zr metals. In some embodiments, the ion-exchanged synthetic phyllosilicate can include about 0.1-10 wt. %, about 0.2-5 wt. %, about 1-5 wt. %, about 2-5 wt. %, or about 2-3 wt. % of one or more of Cu, Fe, Co, Ni, La, Ce, Mn, V, Ag, Ti, Zr metals. In some embodiments, the ion-exchanged synthetic phyllosilicate comprises at least about 1 wt. %, at least about 1.5 wt. %, or at least about 2 wt. % of one or more group IIIB, IVB, VB, VIB, VIIB, VIIIB, IB, or IIB metals. In some embodiments, the ion-exchanged synthetic phyllosilicate includes about 0.1-10 wt. %, about 0.2-5 wt. %, about 1-5 wt. %, about 2-5 wt. %, or about 2-3 wt. % of one or more group IIIB, IVB, VB, VIB, VIIB, VIIIB, IB, or IIB metals. For example, the Fe and/or Cu exchanged synthetic phyllosilicate in some embodiments comprises at least about 1 wt. %, at least about 1.5 wt. %, or at least about 2 wt. % Cu (e.g., CuO) and/or Fe. In some embodiments, the Fe and/or Cu exchanged synthetic phyllosilicate includes about 0.1-10 wt. %, about 0.2-5 wt. %, about 1-5 wt. %, about 2-5 wt. %, or about 2-3 wt. % Cu (e.g., CuO) and/or Fe. In addition, the ion-exchanged (e.g., copper) loading can be increased as long as the metal does not sinter.

While Cu can be exchanged to increase the level of Cu associated with the exchanged sites in the structure of the synthetic phyllosilicate, non-exchanged Cu in salt form, for example, as $CuSO_4$ can, in some embodiments, be left within the Cu exchanged synthetic phyllosilicate catalyst.

Upon calcination, the copper salt can decompose to CuO, which is referred to as "free copper" or "soluble copper." In some embodiments, the free copper can be both active and selective, resulting in low $N_2O$ formation when used in the treatment of a gas stream containing nitrogen oxides. In addition, the free copper can impart greater stability in catalysts subjected to thermal aging.

Ion-Exchanged Synthetic Phyllosilicate SCR Catalysts

In systems that utilize an SCR downstream from an oxidation catalyst such as a diesel oxidation catalyst (DOC), properties of the ion-exchanged synthetic phyllosilicates disclosed herein provide one or more beneficial results according to embodiments disclosed herein. Ion-exchanged synthetic phyllosilicate catalysts produced in accordance with embodiments disclosed herein can reduce $NO_x$ with $NH_3$. In some embodiments, catalysts disclosed herein can reduce $NO_x$ with $NH_3$ at low temperatures. This ability can, in some embodiments, be enhanced by the addition of non-exchanged Cu to the ion-exchanged synthetic phyllosilicate catalyst.

The SCR catalysts disclosed herein can be in the form of self-supporting catalyst particles or as a substrate (e.g., honeycomb monolith) comprising the SCR catalyst composition. In some embodiments, the SCR catalyst composition can be disposed as a washcoat or as a combination of washcoats on a substrate, for example, a honeycomb flow through ceramic or metallic substrate.

In some embodiments, the SCR catalyst can be formed from an ion-exchanged synthetic phyllosilicate material having ion-exchanged copper and/or iron.

When deposited on a substrate, an SCR catalyst composition can be deposited at a concentration of at least about 0.5 $g/in^3$, at least about 1.3 $g/in^3$ or at least about 2.4 $g/in^3$ or higher to ensure that the desired $NO_x$ reduction is achieved and to provide adequate durability of the catalyst over extended use. In some embodiments, bifunctional catalysts are provided.

In some embodiments, a bifunctional catalyst is provided that includes a catalyst system with separate compositions for SCR catalyst activity and AMOx catalyst activity. The catalyst compositions for SCR and AMOx can reside in discrete washcoat layers on the substrate and/or the compositions for SCR and AMOx reside can in discrete zones on the substrate as disclosed in U.S. Pat. No. 8,293,182, which is hereby incorporated by reference in its entirety.

SCR Composition

In some embodiments, a component effective to catalyze the SCR reaction is utilized in a washcoat as part of a $NO_x$ abatement catalyst composition. Typically, the SCR catalyst component is part of a composition that includes other components in a washcoat. However, in some embodiments, the $NO_x$ abatement catalyst composition can include only the SCR catalyst component. The SCR catalyst component can comprise the ion-exchanged, synthetic phyllosilicates disclosed herein. In addition, the SCR catalyst compositions can contain other inorganic materials such as $Al_2O_3$, $SiO_2$, and $ZrO_2$ acting as binders and promoters.

AMOx Composition

In some embodiments, a component effective to catalyze the AMOx reaction is utilized in a $NO_x$ abatement system. In some embodiments, the AMOx catalyst component can be a supported precious metal component which is effective to remove ammonia from an exhaust gas stream. In some embodiments, the AMOx catalyst component can be applied directly to the substrate. In some embodiments, the precious metal can include ruthenium, rhodium, iridium, palladium, platinum, silver, gold, or mixtures or combinations thereof. In some embodiments, the precious metal includes physical mixtures and chemical and atomically-doped combinations of ruthenium, rhodium, iridium, palladium, platinum, silver, or gold. In some embodiments, the precious metal includes platinum. The platinum can be in an amount of about 0.008% to about 2% by weight (metal), based on Pt support loading.

In some embodiments, the precious metal can be deposited by ordinary methods known by those of skill in the art on a high surface area refractory metal oxide support.

Examples of high surface area refractory metal oxide can include alumina, silica, titania, ceria, and zirconia, as well as physical mixtures, chemical combinations, and/or atomically-doped combinations thereof. In some embodiments, the refractory metal oxide can include a mixed oxide such as silica-alumina, amorphous or crystalline aluminosilicates, alumina-zirconia, alumina-lanthana, alumina-chromia, alumina-baria, alumina-ceria, and the like. Some refractory metal oxides can comprise high surface area γ-alumina having a specific surface area of about 50 to about 300 $m^2/g$.

In some embodiments, the AMOx catalyst component can include a zeolitic or non-zeolitic molecular sieve, which may have any one of the framework structures listed in the *Database of Zeolite Structures* published by the International Zeolite Association (IZA). Framework structures can include those of CHA, FAU, BEA, MFI, AEI, and MOR types. In some embodiments, a molecular sieve component can be physically mixed with an oxide supported platinum component. In some embodiments, platinum can be distributed on the external surface or in the channels, cavities, or cages of the molecular sieve. In some embodiments, the catalyst can include two layers for the AMOx reaction, a first layer including a precious metal component, for example, Pt, and a second layer including a molecular sieve, for example, a zeolite.

Substrate

A substrate for the catalyst can be any of those materials typically used for preparing automotive catalysts. In some embodiments, the substrate can comprise a metal or ceramic honeycomb structure. In addition, any suitable substrate can be employed, such as a monolithic flow-through substrate having a plurality of fine, parallel gas flow passages extending from an inlet to an outlet face of the substrate, wherein the passages can be open to fluid flow. The passages can be essentially straight paths from their fluid inlet to their fluid outlet. The passages can be defined by walls on which the catalytic material is coated as a "washcoat" so that the gases flowing through the passages can contact the catalytic material. The flow passages of the monolithic substrate can be thin-walled channels which can be of any suitable cross-sectional shape such as trapezoidal, rectangular, square, sinusoidal, hexagonal, oval, circular, etc. The substrates can contain from about 60 to about 1200 or more gas inlet openings (i.e., "cells") per square inch of cross section (cpsi). For example, a representative commercially-available flow-through substrate includes the Corning 400/6 cordierite material, which is constructed from cordierite and has 400 cpsi and wall thickness of 6 mil. However, it is understood that this disclosure is not limited to a particular substrate type, material, or geometry.

Ceramic substrates can be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

In some embodiments, substrates can be metallic in nature and can be composed of one or more metals or metal alloys. For example, metallic supports can include heat resistant metals and metal alloys such as titanium and stainless steel as well as other alloys in which iron is a substantial or major component. Alloys can contain one or more of nickel, chromium and/or aluminum, and the total amount of these metals may comprise at least 15 wt. % of the alloy. For example, the alloy can include 10-25 wt. % chromium, 3-8 wt. % aluminum and up to 20 wt. % nickel. The alloys can contain small or trace amounts of one or more other metals such as manganese, copper, vanadium, titanium and the like.

The metal substrates can be employed in various shapes such as corrugated sheet or monolithic form. For example, a representative commercially-available metal substrate is manufactured by Emitec. However, it is understood that this disclosure is not limited to a particular substrate type, material, or geometry. The surface of the metal substrates can be oxidized at high temperatures, e.g., 1000° and higher, to form an oxide layer on the surface of the substrate, thereby improving the corrosion resistance of the alloy. High temperature-induced oxidation can also enhance the adherence of the refractory metal oxide support and catalytically-promoting metal components to the substrate.

Wall flow substrates capable of supporting the SCR catalyst compositions according to some embodiments have a plurality of fine, substantially parallel gas flow passages extending along the longitudinal axis of the substrate. At least one of the passages can be blocked at one end of the substrate body. In some embodiments, each passage is blocked at one end of the substrate body, with alternate passages blocked at opposite end-faces. Monolithic carriers can contain up to about 700 or more flow passages (or "cells") per square inch of cross section, although less can be used. For example, the carrier can have from about 7 to about 600 or about 100 to about 400 cells per square inch ("cpsi"). The cells can have cross sections that are rectangular, square, circular, oval, triangular, hexagonal, or are of other polygonal shapes. Wall flow substrates can have a wall thickness between about 0.002 and 0.1 inches or between about 0.002 and 0.015 inches. In some embodiments, the substrate can have asymmetric channels.

Wall flow substrates can be composed of ceramic-like materials such as cordierite, alpha-alumina, silicon carbide, silicon nitride, zirconia, mullite, spodumene, alumina-silica-magnesia or zirconium silicate, or of porous refractory metal. Wall flow substrates can also be formed of ceramic fiber composite materials. In some embodiments, the wall flow substrate is formed from cordierite and silicon carbide. The wall flow substrates can be coated with an SCR catalyst washcoat and/or an AMOx catalyst washcoat for its entire axial length, or a portion of the total axial length of the filter. The wall flow substrate can remove particulate matter along with gaseous pollutants. The loading of the catalytic compositions on a wall flow substrate can depend on substrate properties such as porosity and wall thickness. In some embodiments, the loading of the catalytic composition on a wall flow substrate can be lower than the loading on a flow through substrate. A corner fill layer, a buffer layer, or adhesion layer such as a thin Boehmite layer, may be applied to the substrate prior to applying any of the active washcoat layers, but is not required.

Wall flow substrates can include thin porous walled honeycombs (monoliths) through which the fluid stream passes without causing too great an increase in back pressure or pressure across the article. Normally, the presence of a clean wall flow article can create a back pressure of 1 inch water column to 10 psig. In some embodiments, ceramic wall flow substrates can be formed of a material having a porosity of at least about 40% or 45% (e.g., from about 40% to 80%) having a mean pore size of at least about 5 microns (e.g., from about 5 to 30 microns). In some embodiments, the materials can have a porosity of at least 50% (e.g., from about 50% to 80%). The porosity of the material that forms the walls can be defined by density of the wall versus the theoretical density of material. In some embodiments, the substrates can have a porosity of at least about 55% and have a mean pore size of at least about 10 microns.

When substrates with these porosities and these mean pore sizes are coated with the techniques described below, adequate levels of SCR catalyst compositions can be loaded onto the substrates to achieve excellent $NO_x$ conversion efficiency. U.S. Pat. No. 4,329,162 is herein incorporated by reference in its entirety with respect to the disclosure of wall flow substrates.

In the following descriptions, the percentages of the components of the washcoat compositions are provided in terms of the amount of solids present in the washcoat compositions, as the washcoat compositions can be provided in an aqueous suspension or, in some instances, as dry powder. The "layers" refers to the corresponding washcoat composition after it has been applied to the substrate, dried, and calcined.

General Washcoat Preparation, Drying, and Calcining

In some embodiments, the SCR catalyst compositions and the AMOx catalyst compositions can be applied in washcoats, which are coated upon and adhered to the substrate.

For example, SCR washcoat compositions with an SCR catalyst component (i.e., an ion-exchanged synthetic phyllosilicate as disclosed herein) can be prepared using a binder. In some embodiments, a $ZrO_2$ binder derived from a suitable precursor such as zirconyl acetate or any other suitable zirconium precursor such as zirconyl nitrate can be used. In some embodiments, a zirconyl acetate binder can provide a catalytic coating that remains homogeneous and intact after thermal aging, for example, when the catalyst is exposed to high temperatures of at least about 600° C., for example, about 800° C. and higher, and higher water vapor environments of about 10% or more. In some embodiments, keeping the washcoat intact can be beneficial because loose or free coating could plug a downstream a catalyzed soot filter (CSF) causing the backpressure to increase.

In some embodiments, the ion-exchanged synthetic phyllosilicate comprises about 50 to about 99 wt. %, about 60 to about 97 wt. %, or about 75 to about 95 wt. % of the combination of ion-exchanged synthetic phyllosilicate and binder in the SCR washcoat composition. In some embodiments, the binder comprises about 1 to about 50 wt. %, about 3 to about 40 wt. %, or about 5 to about 25 wt. % of the combination of ion-exchanged synthetic phyllosilicate and binder in the SCR washcoat composition. For example, AMOx washcoats with an AMOx catalyst component can be formed by preparing a mixture or a solution of a precious metal precursor in a suitable solvent, e.g., water. Typically, the precious metal precursor can be utilized in the form of a compound or complex to achieve dispersion of the precious metal precursor on the support. The term "precious metal precursor" can refer to any compound, complex, or the like which, upon calcination or initial phase of use thereof, decomposes or otherwise converts to a catalytically active form. Platinum complexes or compounds can include platinum chlorides (e.g., salts of $[PtCl_4]^{-2}$, $[PtCl_6]^{-4}$), platinum hydroxides (e.g., salts of $[Pt(OH)_6]^{-2}$, platinum amines (e.g., salts of $[Pt(NH_3)_2]^{+2}$, $[Pt(NH_3)_4]^{+4}$), platinum hydrates (e.g., salts of $[Pt(OH_2)_4]^{+2}$), platinum bis(acetylacetonates), and mixed compounds or complexes (e.g., $[Pt(NH_3)_2(Cl)_2]$). For example, a representative commercially-available platinum source can include 99% ammonium hexachloroplatinate from Strem Chemicals, Inc., which may contain traces of other precious metals. However, it will be understood that this invention is not restricted to platinum precursors of a particular type, composition, or purity. A mixture or solution of the precious metal precursor can be added to the support by one of several chemical means. For example, these can include impregnation of a solution of the precious metal precursor onto the support, which may be followed by a fixation step incorporating an acidic component (e.g., acetic acid) or a basic component (e.g., ammonium hydroxide). The wet solid can be chemically reduced or calcined or can be used as is. Alternatively, the support can be suspended in a suitable vehicle (e.g., water) and reacted with the precious metal precursor in solution. Additional optional processing steps include fixation by an acidic component (e.g., acetic acid) or a basic component (e.g., ammonium hydroxide), chemical reduction, or calcination.

To apply a washcoat layer to a substrate, a washcoat composition can be suspended in an appropriate vehicle, e.g., water, to form a slurry. Other promoters and/or stabilizers and/or surfactants can be added to the slurry as mixtures or solutions in water or a water-miscible vehicle. In some embodiments, the slurry can be comminuted to result in substantially all of the solids having particle sizes of less than about 10 microns, i.e., in the range of about 0.1-8 microns, average diameter. The comminution can be accomplished in a ball mill, continuous Eiger mill, or other similar equipment. In some embodiments, the suspension or slurry has a pH of about 2 to less than about 7. The pH of the slurry can be adjusted if necessary by the addition of an adequate amount of an inorganic or organic acid to the slurry. The solids content of the slurry can be about 20-60 wt. % or about 35-45 wt. %. A substrate can then be dipped into the slurry, or the slurry otherwise may be coated on the substrate, such that there will be deposited on the substrate a desired loading of the washcoat composition. Thereafter, the coated substrate can be dried at about 100° C. and calcined by heating at about 300-650° C. for about 1 to about 3 hours. Drying and calcining can be done in air. The coating, drying, and calcination processes may be repeated if necessary to achieve a final desired gravimetric amount of a washcoat composition on the substrate.

After calcining, the loading on the substrate can be determined through calculation of the difference in coated and uncoated weights of the substrate. In some embodiments, the SCR washcoat layer(s) on the substrate has a loading of from about 0.1-10 $g/in^3$, about 0.1-5 $g/in^3$, or about 0.1-2.5 $g/in^3$. In some embodiments, the SCR washcoat layer(s) on the substrate has a loading of from about 0.5-10 $g/in^3$, about 0.5-5 $g/in^3$, or about 0.5-2.5 $g/in^3$. In some embodiments, the AMOx washcoat layer(s) on the substrate may be applied as a loading of from about 0.1 to about 1 $g/in^3$. The loading can be modified by altering the solids content of the coating slurry and slurry viscosity. Alternatively, repeated immersions or repeated coatings of the substrate can be conducted, followed by removal of the excess slurry as described above. For example, one or more additional washcoat layers can be provided to the substrate. After a layer is applied, or after a number of desired layers is applied, the substrate can be dried and calcined.

Zone Coating

Zone coating can be used to separate various washcoats into a zoned configuration of different coatings on a substrate rather than having the washcoats in a layered configuration on the substrate. Zone coating methods on substrates are known to those of ordinary skill in the art. Zone coated catalysts can be readily produced by methods such as that described in U.S. Pat. No. 8,293,182, which has previously been incorporated by reference in its entirety. Zone coating can be accomplished by dipping a first end of a substrate into a first washcoat slurry, and subsequently dipping the second end of the substrate into a second washcoat slurry. Other methods of zone coating known in the art can be used.

Zone coating can be used to separate various washcoat layers into different zones on a substrate, rather than having the washcoat layers in the same zone on the substrate. In other words, instead of coating a substrate with a first washcoat, and then coating the substrate with a second washcoat disposed on top of the first washcoat, the substrate can be coated in one zone with a first washcoat, and then in a second zone with a second washcoat, so that the contact (or overlap) between different washcoat layers can be adjusted as desired, including minimizing contact or eliminating contact between different washcoat layers if desired. In some embodiments, there can be an uncoated gap between different washcoat layers. The gap should be as small as practical so as to maximize the use of the surface area of the substrate. Furthermore, at least a portion of one zone comprising a first washcoat layer can overlap with at least a portion of a second zone having a second washcoat layer, thereby forming a third zone, i.e., an overlap zone. It is also possible for one or more of the zones on the substrate to share a common washcoat composition or washcoat layer, such as a corner fill layer.

Washcoat compositions comprising the SCR catalyst compositions and AMOx catalyst compositions may be used to provide one or more layers in a coating on one or more zones or sections of a substrate used for catalysis, such as an SCR substrate. Accordingly, one or more washcoat compositions can be used to provide one or more layers in a coating on a first zone of a substrate and one or more washcoat compositions can be used to provide one or more layers in a coating on a second zone of a substrate. The substrates can have more than one zone, each with one or more washcoat compositions to provide one or more layers in a coating to a zone of the substrate. In addition, some of the zones of the substrate may not contain any washcoat composition or washcoat layer in a coating.

It should be noted that the washcoats can be coated onto the substrate in any order. That is, the first washcoat composition can be coated onto the first zone, followed by coating the second washcoat composition onto the second zone; or the second washcoat composition can be coated onto the second zone, followed by coating the first washcoat composition onto the first zone. The substrate can be calcined after the initial washcoating of one of the zones onto the substrate, followed by washcoating the remaining zone onto the substrate and a second calcination of the substrate; or both zones can be washcoated onto the substrate prior to calcination of the substrate.

The zones of the substrate can occupy in the range of about 10 to about 80% of the axial length of the substrate. In some embodiments, each zone can occupy the same amount of axial length of the substrate.

By zone coating the substrate, particular washcoats can be applied to particular zones of the substrate in a particular combination to achieve a certain result. For example, an AMOx washcoat can be applied from the outlet end of a substrate toward the inlet end over less than the entire length of the substrate (i.e., within one zone); an SCR washcoat layer can be applied from the inlet end of the substrate toward the outlet end over less than the entire length of the substrate (i.e., within another zone, which may or may not overlap with the first zone). The inlet end can refer to the end of the substrate where fluid such as an exhaust stream first comes into contact with the substrate and the outlet end can refer to the end of the substrate where fluid exits the substrate. As such, in some embodiments, the two zones comprising the AMOx washcoat layer and SCR washcoat layer can overlap to form a third zone: the inlet zone (SCR zone) can remove $NO_x$ by selective catalytic reduction, the overlap zone (AMOx zone) can oxidize ammonia, and the outlet zone (DOC zone) can allow for the oxidation of CO and/or hydrocarbons. In some embodiments, the SCR zone, the AMOx zone, and the DOC zone are disposed on a single catalyst substrate. The SCR zone can range from about 50% to about 90% or about 20% to about 90% of the substrate length. The AMOx zone can range from about 5% to about 50% of the substrate length. The DOC zone can range from about 5% to about 50% of the substrate length.

In addition, it is also possible to use multiple substrates in series instead of a single zone coated substrate. In some embodiments, the upstream SCR zone can be disposed on one catalyst substrate and the downstream AMOx zone can be disposed on a separate catalyst substrate. The volume of the downstream AMOx catalyst can be in the range of about 10 to about 100% of the volume of the upstream SCR catalyst.

In use, upstream SCR zones can be responsible for removing $NO_x$ emission from the exhaust by ammonia selective catalytic reduction reaction. The downstream AMOx zone can be responsible for the ammonia oxidation function. However, as discussed herein, the AMOx zone having an overlayer of the SCR composition can have SCR activity and can further function in $NO_x$ abatement.

Method of Preparing a Catalyst

A method for forming a zone coated substrate is herein disclosed. The method can include coating a substrate with a first washcoat composition that includes an AMOx catalyst component. The method can further include coating the substrate with a second washcoat composition that includes an SCR catalyst component (e.g., ion-exchanged synthetic phyllosilicate). In some embodiments, the second washcoat composition can be formed on a zone between an inlet end and an outlet end of the substrate at least partially overlapping the first washcoat composition to provide three zones: a first zone to abate ammonia selective catalytic reduction, a second zone to oxidize ammonia, and a third zone to oxidize carbon monoxide and/or hydrocarbons. A drying process and a calcining process can be performed between each coating step.

Figure 4A:
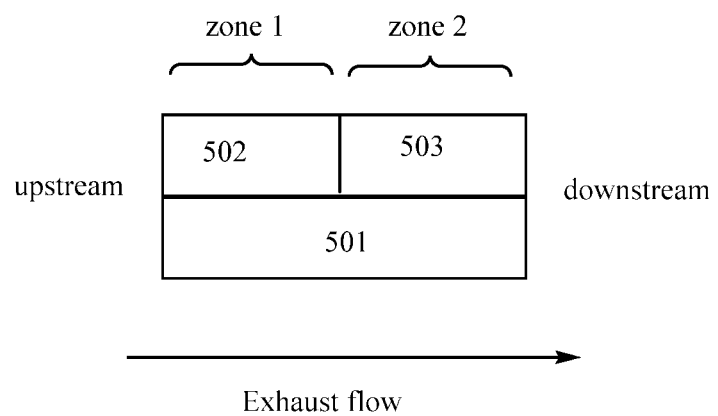
FIGS. 4A-4C illustrate coated substrate formations in accordance with some embodiments disclosed herein.
Figure 4B:
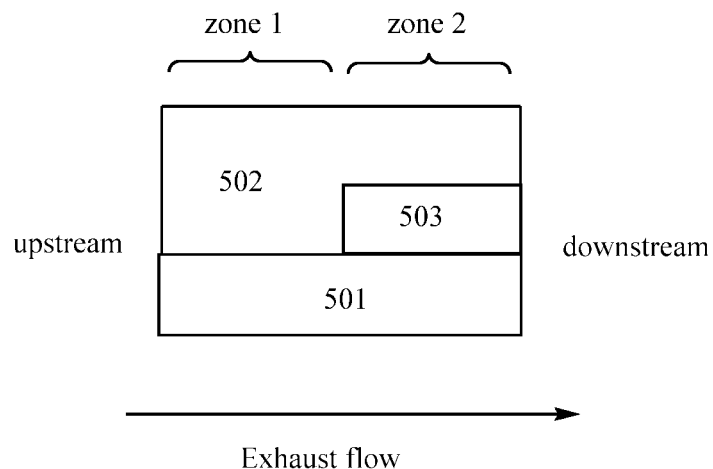
Figure 4C:
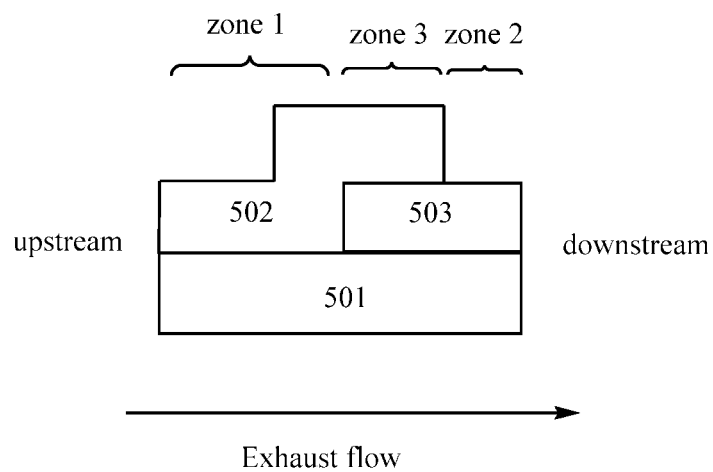

FIGS. 4A-C illustrates embodiments of a zone coated substrate disclosed herein. It should be noted that the washcoats are coated on the surface of the interior channels of the substrate; the highly schematic drawing of FIG. 4A-4C is simply meant to aid in conceptualizing the separation of the different washcoats in the different zones, and is not meant to be a detailed physical representation, nor are the dimensions drawn to scale (the same holds true for all other figures illustrating washcoats on a substrate). FIGS. 4A-C illustrate substrate 501 and washcoat layers 502 and 503. However, additional washcoat layers can be employed.

In addition, although FIGS. 4A-4C illustrate a washcoat layer on the entire surface of the substrate, various portions of the substrate can remain uncoated such as the inlet end, the outlet end, or spaces between washcoat layers. With reference to the sequence that exhaust fluid can flow to substrate 501, washcoat 502 is preferably upstream from washcoat 503. Preferably, washcoat layer 502 can be a SCR washcoat layer and washcoat layer 503 can be an AMOx washcoat layer. For example, FIG. 4A shows a zoned coated substrate, wherein substrate 501 has washcoat layer 502 in zone 1 and washcoat layer 503 in zone 2. There can also be a gap or space (not shown) between washcoat layer 502 and washcoat layer 503 on the substrate. FIG. 4B shows a zoned coated substrate, wherein washcoat layer 502 overlaps the entire washcoat layer 503 to form zone 2. FIG. 4C shows a zoned coated substrate, wherein washcoat layer 502 overlaps a portion of washcoat layer 503 to form zone 2. Thus, the uncoated portion of washcoat layer 503 forms zone 3.

Method for Treating Emissions

Methods of treating emissions produced in an exhaust gas stream of an engine are herein disclosed. The exhaust gas stream can include one or more of $NO_x$, CO, hydrocarbons, and ammonia. In some embodiments, the method includes injecting ammonia or an ammonia precursor into an exhaust gas stream and then passing the exhaust gas first through an upstream SCR zone described herein to remove $NO_x$ by selective catalytic reduction. In some embodiments, after the SCR zone, the exhaust gas can be passed through an AMOx zone to remove ammonia by oxidation. In some embodiments, after the SCR zone, the exhaust gas can be passed through a midstream AMOx zone to remove ammonia by oxidation. The midstream AMOx zone can be followed by a downstream zone which oxidizes one or more of CO and hydrocarbons.

Emission Treatment System

Figure 5:
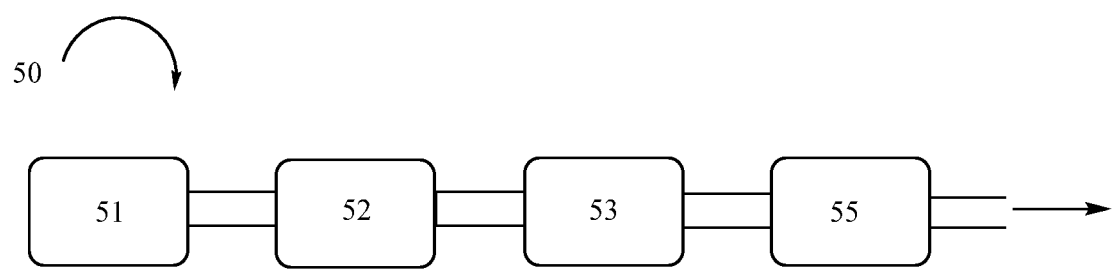
FIG. 5 illustrates a schematic of an engine emission treatment system in accordance with some embodiments disclosed herein.

It is understood that the coated substrates described herein can be employed in exhaust treatment systems. The exhaust treatment systems can be that for treating an exhaust gas from a diesel or lean-burn engine. In addition, the emission treatment systems disclosed herein can also be employed for vehicles, particularly diesel or lean-burn vehicles. FIG. 5 illustrates some embodiments of emission treatment system 50 including engine 51 emitting an exhaust stream including particulate matter, $NO_x$, and CO, as well as other material. Substrate 55 has an inlet end and an outlet end defining an axial length. Substrate 55 is positioned downstream of and in flow communication with engine 51. Substrate 55 has an AMOx washcoat. The AMOx washcoat can extend from the outlet end toward the inlet end over less than the entire axial length of the substrate. Substrate 55 also has an SCR washcoat containing ion-exchanged synthetic phyllosilicate in accordance with some embodiments disclosed herein. The SCR washcoat can extend from the inlet end toward the outlet end over less than the entire axial length of the substrate. The SCR washcoat can overlap at least a portion of the AMOx washcoat layer.

In some embodiments, the system can include oxidation substrate 52 having an oxidation catalyst component washcoat. In these embodiments, the exhaust stream can be first conveyed to oxidation substrate 52 where at least some of the gaseous hydrocarbons, CO, and particulate matter are combusted to innocuous components. In addition, a fraction of the NO of the $NO_x$ component of the exhaust can be converted to $NO_2$. Higher proportions of $NO_2$ in the $NO_x$ component facilitate the reduction of $NO_x$ in the SCR catalyst located downstream. Oxidation substrate 52 can be in flow communication with the exhaust stream from engine 51 and disposed between engine 51 and substrate 55. In the case of a diesel engine, oxidation substrate 52 is often referred to as a diesel oxidation catalyst. In some embodiments, after oxidation substrate 52, exhaust treatment system 50 can include a catalyzed soot filter (not shown). As such, exhaust gas from the engine can flow through oxidation substrate 52 to the catalyzed soot filter and then to substrate 55.

In some embodiments, there can be an upstream substrate 53 having an SCR washcoat layer. Upstream substrate 53 can be in flow communication with the exhaust stream from engine 51 and disposed between engine 51 and substrate 55.

Without intending to limit the disclosure in any manner, embodiments disclosed herein will be more fully described by the following examples.

This application discloses several numerical ranges in the text and figures.

The numerical ranges disclosed inherently support any range or value within the disclosed numerical ranges even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure.

Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

That which is claimed:

1. A method of preparing a catalyst comprising:
hydrothermally synthesizing a phyllosilicate having a structure according to formula (2):

$$I_y M_z (Al_m B)(X)_q \qquad (2)$$

wherein I is an interlayer monovalent cation selected from organic ammonium and $NH_4^+$;

y is 0, 1, 2, 3 or 4;

M is a cation or mixture of cations selected from the group consisting of $Zn^{+2}$, $Mg^{+2}$, $Cu^{+2}$, $Fe^{+2}$, $Fe^{+3}$, $Al^{+2}$, $Al^{+3}$, and $Mn^{+2}$;

z is 0, 1, 2, 3 or 4;

q is 2 or 4;

X is a monovalent ion selected from a fluoride ion, hydroxide ion, and mixtures thereof;

B is selected from the group consisting of $Si_3O_{10}$, $Si_2O_{10}$, $Si_2O_5$, and $Si_4O_{10}$;

m is 0, 1, 2, 3 or 4; and wherein the hydrothermally synthesized phyllosilicate is substantially free of alkali metal;
pillaring the hydrothermally synthesized phyllosilicate, the pillaring comprising calcining the hydrothermally synthesized phyllosilicate; and
exchanging a cation present in the pillared hydrothermally synthesized phyllosilicate with one or more metal cations, forming a pillared ion-exchanged hydrothermally synthesized phyllosilicate.

2. The method of claim 1, wherein the one or more metal cations are selected from the group consisting of Cu, Fe, Co, Ni, La, Ce, Mn, V, Ag, Ti, and Zr.

3. The method of claim 1, wherein the one or more metal cations are copper cations or iron cations.

4. The method of claim 1, wherein B is $Si_3O_{10}$ and m is 1.

5. The method of claim 1, wherein the pillared, hydrothermally synthesized phyllosilicate has a surface area of at least 25 $m^2/g$.

6. The method of claim 1, wherein the pillared, hydrothermally synthesized phyllosilicate has a surface area greater than the surface area of the synthesized phyllosilicate.

7. The method of claim 1, wherein the pillared, hydrothermally synthesized phyllosilicate has a surface area of at least 50 $m^2/g$.

8. The method of claim 1, wherein the pillared ion-exchanged, hydrothermally synthesized phyllosilicate comprises at least 1 wt. % of the one or more metal cations, the one or more metal cations selected from the group consisting of Cu, Fe, Co, Ni, La, Ce, Mn, V, Ag, Ti, and Zr.

* * * * *